April 29, 1952  L. G. EHMANN  2,595,131
LOAD GRIP MEANS FOR TRUCKS AND THE LIKE
Filed Aug. 10, 1950  3 Sheets-Sheet 1
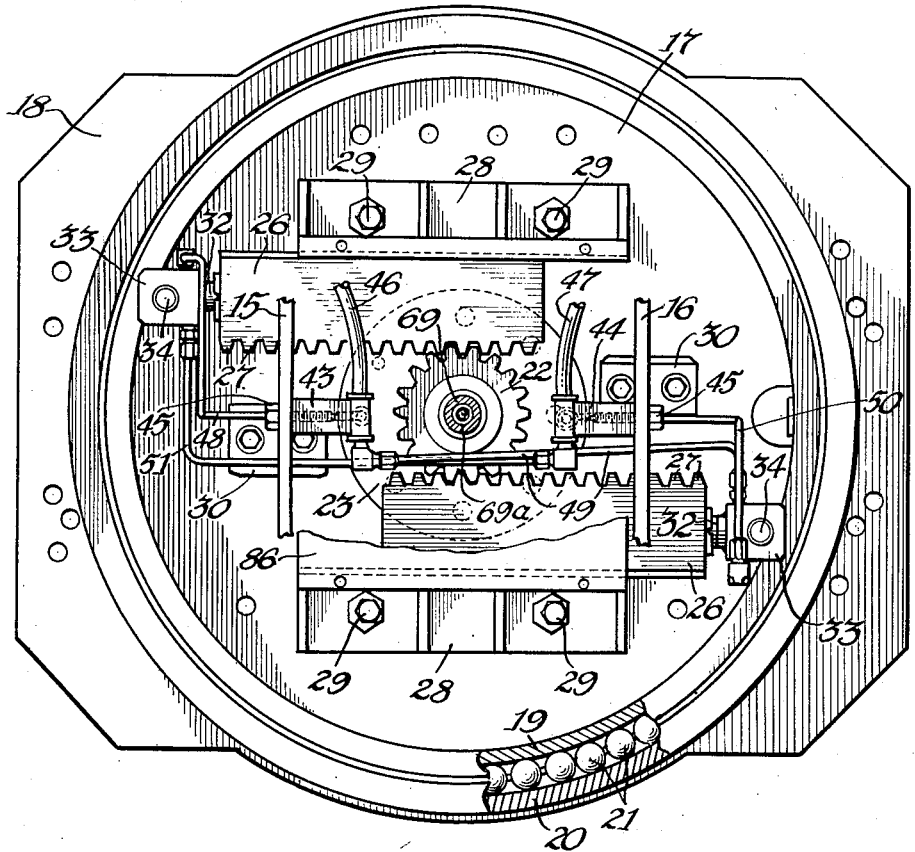
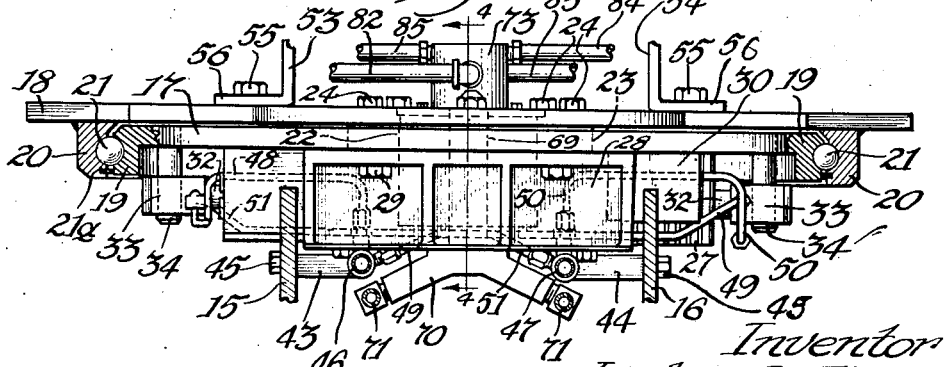
Inventor
Leslie G. Ehmann
By Albert D. McCaleb
Atty.

April 29, 1952 L. G. EHMANN 2,595,131
LOAD GRIP MEANS FOR TRUCKS AND THE LIKE
Filed Aug. 10, 1950 3 Sheets-Sheet 2
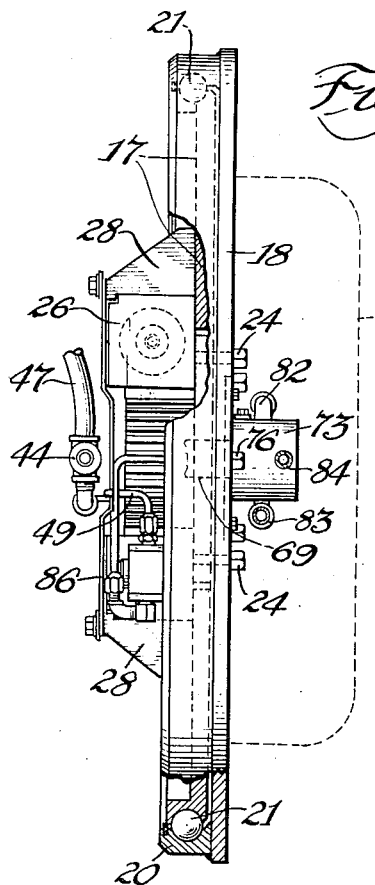
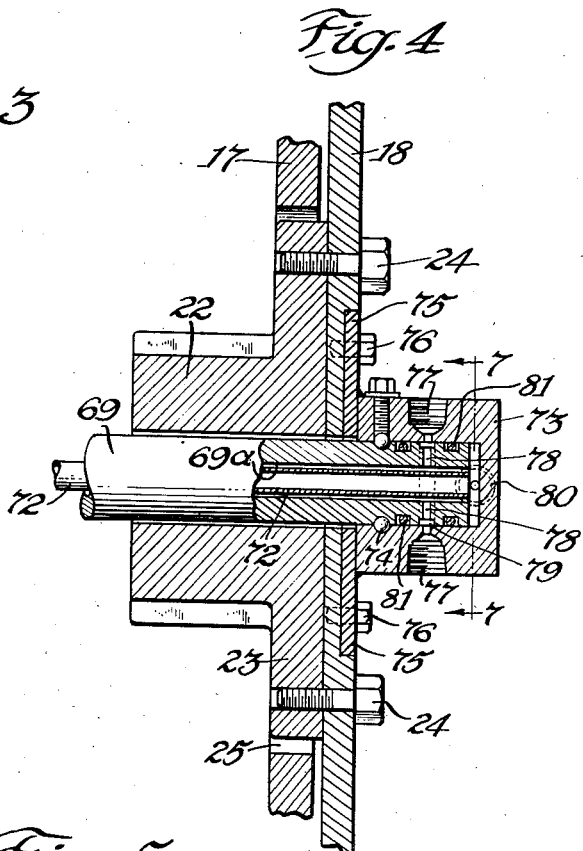
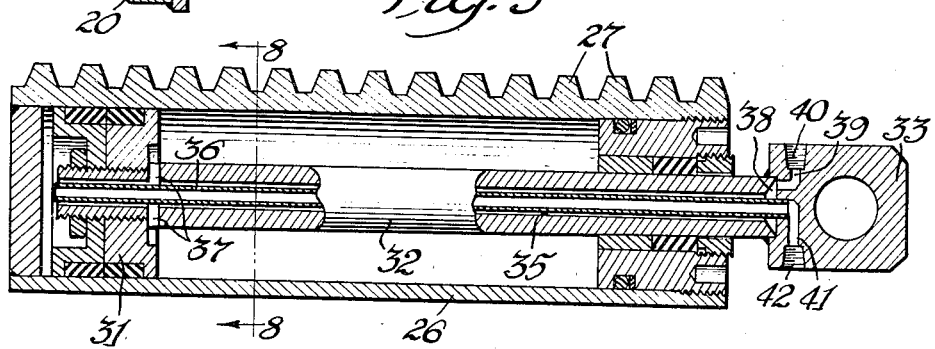
Inventor
Leslie G. Ehmann
By Albert G. McCaleb
Atty.

April 29, 1952  L. G. EHMANN  2,595,131
LOAD GRIP MEANS FOR TRUCKS AND THE LIKE
Filed Aug. 10, 1950  3 Sheets-Sheet 3
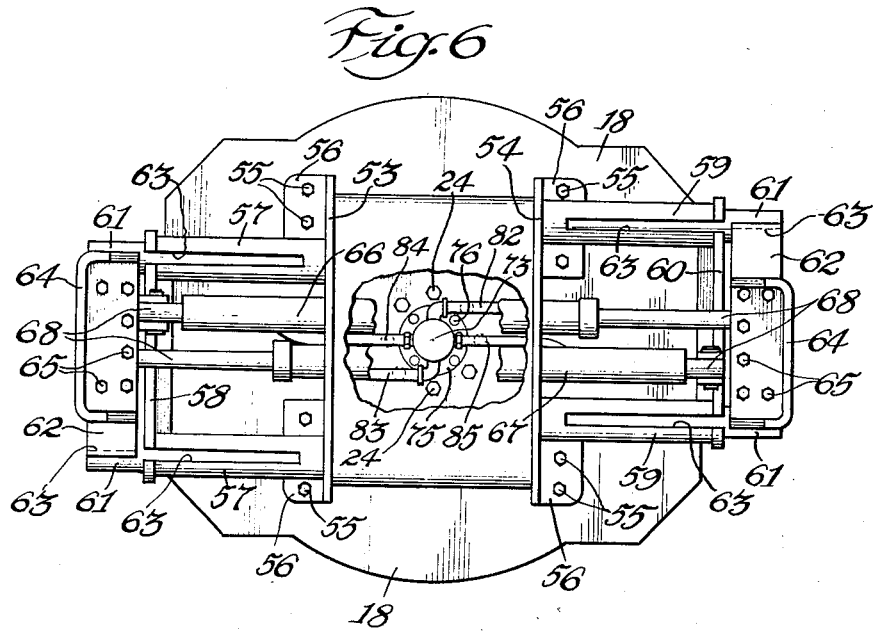
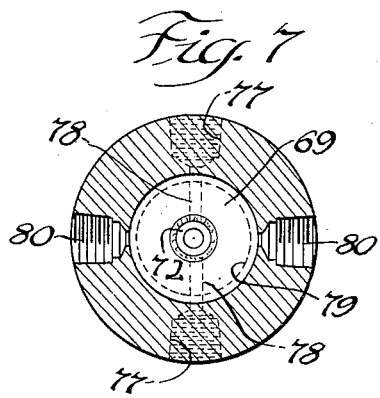
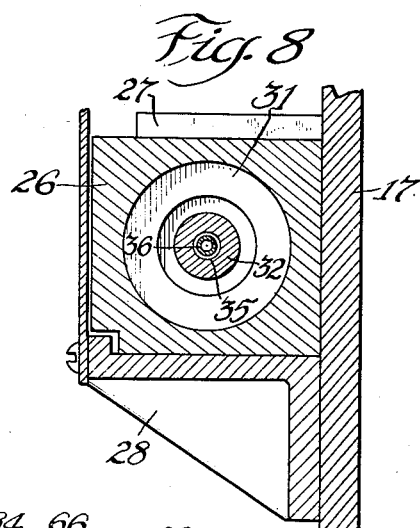
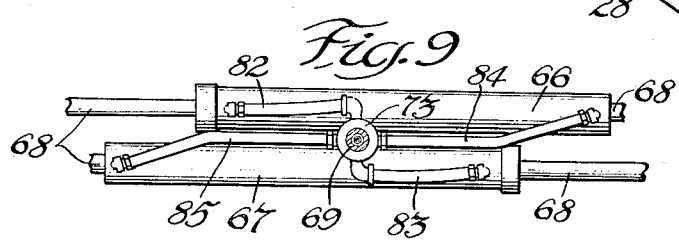
Inventor
Leslie G. Ehmann
By Albert G. McCaleb
Atty.

Patented Apr. 29, 1952

2,595,131

UNITED STATES PATENT OFFICE 2,595,131

LOAD GRIP MEANS FOR TRUCKS AND THE LIKE

Leslie G. Ehmann, Portland, Oreg., assignor to Hyster Company, Portland, Oreg., a corporation of Oregon Application August 10, 1950, Serial No. 178,743

5 Claims. (Cl. 214—66)

This invention relates to load grip means for use on trucks or other load handling apparatus, and it has for its object the provision of a new and improved form and arrangement of parts by which a load can be picked up by arms movable toward and from each other so as to grip the load by pressure from opposite sides thereof, for transporting the load, or for handling the material in connection with loading or unloading operations, and by which preferably the load can be turned through an angle of 180 degrees or more for piling it for storage or the like.

It is one of the objects of my invention to provide an improved form of revolving apron structure for lift trucks and the like, by the use of which the desired rotation of a carried load is accomplished, and improved means for bringing about the rotary movements of the parts. In a lift truck designed for use in a manufacturing plant or a warehouse, it is important that the capacity for lifting heavy loads be maintained at a high level, with the load positioned with respect to the truck and its carrying wheels so that the load shall not over-balance the counterweight portion of the truck, and so that the load handling means shall be readily controllable to enable the operator readily to shift the position of the load for enabling the truck and its load to move through comparatively narrow passageways and to make comparatively sharp turns. In a truck of this kind in which the load is carried at the front end of the vehicle and is given its vertical movements by the use of a lifting device movably mounted at the front end of the truck, it is highly important that the weight of the lifting mechanism and the rotating mechanism itself be kept to a minimum so far as such weight is effective in opposition to the counterweight effect of the body of the truck. As a result of these considerations, it is highly important that the means for rotating the load and for moving the gripping arms toward and from each other be made as compact as possible and be made as light as possible consistently with the strength of parts necessary for accomplishing the desired results.

For attaining these objects, I have provided an improved revolving apron structure for rotating the gripping arm assembly, comprising means for rotating a movable member of such revolving apron with respect to a fixed member, and including a combination cylinder and rack-bar member formed integrally with each other; with the cylinder mounted movably in position, with a piston and piston rod held stationary, and with fluid under pressure fed to the opposite end portions of the movably mounted cylinder through openings extending longitudinally through the stationary piston rod.

In keeping with these same objects, I have provided improved means for feeding fluid under pressure selectively to the opposite end portions of cylinders employed for moving the gripping arms toward and from each other to apply pressure on opposite side faces of the load to be handled. This improved means comprises a rod having openings longitudinally therethrough, with a revolving head mounted on the end of the rod and held releasably in position thereon by an end-thrust ball bearing about the rod. Means is provided for delivering fluid under pressure selectively to said longitudinal openings through the rod, and connections are provided from said longitudinal openings to fitting-sockets provided by said revolving head, which fitting-sockets in turn are connected with the opposite end portions of the several cylinders. Sealing rings are provided about the rod at opposite sides of the openings in the rod by which connection is effected with the fitting-sockets employed for feeding fluid under pressure to the appropriate ends of the cylinders for causing the gripping arms to move toward each other, so as to avoid the application of an end-thrust effect on said rod by the heavy pressure fed to the cylinders for the gripping operation.

Other objects and advantages will be apparent also from the following description of an exemplary embodiment of my invention disclosed for illustrative purposes by reference to the accompanying drawings, in which:

Fig. 1 is a rear face view of a revolving apron structure comprising my invention, with certain of the parts broken away for clearness of illustration;

Fig. 2 is a top plan view of the apparatus shown in Fig. 1;

Fig. 3 is a side view of the apparatus as seen from the right in Figs. 1 and 2, with certain of the parts shown in section, and with certain of the mechanism carried by the apron shown diagrammatically;

Fig. 4 is a vertical sectional view taken on an enlarged scale on the line 4—4 of Fig. 2;

Fig. 5 is a longitudinal sectional view through a combination cylinder and rack bar member and the parts associated therewith;

Fig. 6 is a front face view of my revolving apron with my improved load gripping means mounted thereon;

Fig. 7 is a vertical cross sectional view taken substantially at the line 7—7 of Fig. 4;

Fig. 8 is a vertical sectional view taken substantially at the line 8—8 of Fig. 5, and showing in addition certain of the mounting means forming a part of my structure; and Fig. 9 is a rear face view of the actuating cylinders forming a part of my improved load grip means as shown in Fig. 6.

Referring now to the several figures of the drawings, in which corresponding parts are indicated by the same reference characters, 15 and 16 indicate the side plate members of a load carriage which is movable vertically by power on the front end portion of a lift truck. On the front face of the load carriage, I have mounted my improved revolving apron structure, comprising a heavy metal plate 17 rigidly secured to the load carriage, and a second metal plate 18 rotatably mounted on the plate 17 in substantially face-to-face relationship thereto. In the construction illustrated, the plates 17 and 18 are provided with flanges 19 and 20, respectively, between which a series of balls 21 are mounted in suitable raceways in the faces of the flanges. The arrangement is such that the plate 17 is supported rigidly in position with respect to the load carriage, and that the plate 18 is readily rotatable about the plate 17. A gasket 21a is provided for closing the annular space between the flanges 19 and 20 adjacent to the balls 21.

The means for giving the plate 18 rotary movements with respect to the plate 17 comprises a pinion 22 carried by a disk 23 rigidly secured to the plate 18 by machine screws 24, as clearly shown in Fig. 4, the disk 23 being mounted in a suitable opening 25 through the plate 17. At opposite faces of the pinion 22, I have provided actuating members for causing rotation of the pinion and the plate 18 with respect to the plate 17, each of said actuating members in the construction shown comprising a cylinder 26 and a rack bar 27 the teeth of which are formed directly on the face of the cylinder, as is clearly shown by Figs. 5 and 8. In the preferred arrangement as shown in the drawings, each of the cylinders is in the form of a metal bar substantially square in cross section, with the teeth 27 formed on one side face, and with a central bore longitudinally of the bar for providing the cylinder chamber.

As is best shown in Fig. 1, the rack bar 27 of each of the combination rack bar and cylinder members meshes with the pinion 22, the cylinders being slidably mounted on the face of the plate 17, and being held slidably in position by guide brackets 28 in over-hanging relationship to the cylinders, such guide brackets being adjustably mounted in position by machine screws 29 so as to be capable of being tightened into suitable working position with respect to the cylinder. Additional guides 30 are provided on the face of the plate 17 in position to engage the ends of the teeth of the rack bar in the movements of the rack bar and the cylinder along the plate 17 for assisting in holding the cylinders in operative position.

Each of the cylinders 26 is provided with a piston 31 therein carried by a piston rod 32 having a block 33 fixedly secured on its outer end, each of such blocks 33 being secured to the plate 17 by a pin 34. As is clearly shown in Fig. 5, each of the piston rods 32 is provided with a central bore 35 longitudinally thereof, with a tube 36 mounted in such bore in spaced relation to the wall of the bore. As is clearly shown in Fig. 5, the bore 35 of each of the piston rods is connected at one end portion by openings 37 with the cylinder chamber at one face of the piston, and is connected at its opposite end by openings 38 and 39 with a socket 40 in the face of the block 33. The end of the tube 36 of each of the piston rods opens directly to the cylinder chamber at the opposite face of the piston, said tube being connected at its other end by an opening 41 to a socket 42 in the face of said block 33.

With the parts in the position as shown in Fig. 5, when fluid under pressure is fed to the socket 42 in the bottom face of the block 33, the cylinder 26, as shown in said Fig. 5, is forced to move toward the left causing the pinion 22 and the connected plate 18 to revolve in clockwise direction, as shown in Fig. 1, with respect to the plate 17. When thereafter fluid under pressure is fed to the socket 40 in the top face of the block 33, as shown in said Fig. 5, the cylinder 26 is forced to move toward the right in said figure, causing the pinion 22 and the connected plate 18 to revolve in counterclockwise direction, in Fig. 1. The construction is such, as shown in Fig. 1, that the upper cylinder 26 always moves in the opposite direction as compared with the lower cylinder 26, so as to cooperate therewith for rotating the plate 18 through an angle of slightly more than 180°.

As is clearly shown in Figs. 1 and 2, fittings 43 and 44 are mounted by machine screws 45 on the inner faces of the side plates 15 and 16 of the load carriage, such fittings being connected with flexible tubes 46 and 47 which in turn are connected with a suitable source of fluid under pressure, the arrangement being such that either of said tubes 46 or 47 may be subjected to pressure conditions selectively. The fitting 43 is connected by tubes 48 and 49 with the sockets 40 of the blocks 33, while the fitting 44 is connected by tubes 50 and 51 with the sockets 42 of said blocks 33. Thus, when pressure is applied through the tube 46, the two cylinders 26 are moved simultaneously in the direction to have cooperative action for rotating the plate 18 with respect to the plate 17. In like manner, when pressure is applied through the tube 47, the tube cylinders 26 are moved simultaneously in the opposite direction for rotating the plate 18 in the reverse direction.

My improved load grip means is mounted on the front face of the plate 18, being shown diagrammatically in Fig. 3, and there designated by the reference character 52. As shown more in detail in Fig. 6, this means comprises two frame plates 53 and 54 secured in position by machine screws 55 passing through brackets 56 carried by such frame plates. Rigidly mounted on the frame plates 53 and 54, there are a plurality of tubular guides extending along the face of the plate 18. Two of said guides 57 extend toward the left in Fig. 6 and are connected together at their outer ends by a plate 58; and two similar guides 59 extend toward the right in said Fig. 6, and are connected together at their outer ends by a plate 60. Within the tubular guides, there are slidably mounted slide rods 61 connected together at their outer ends by vertically disposed plates 62 in spaced position laterally with respect to each other; said plates 62 having their end portions positioned at right angles to the main portions of the plates so as to enter slots 63 in the front faces of the tubular guides 57 and 59 for enabling the plates 62 to have substantial movements toward and from the frame plates 53 and 54. On the front faces of the plates 62, pressure arms 64 are mounted rigidly in position by means of machine screws 65 so as to be movable toward and from each other with the plates 62 for gripping a suitable load between the arms.

For moving the arms 64 toward and from each other, means is provided comprising cylinders 66 and 67 mounted on the frame bars 53 and 54, such cylinders being provided with suitable pistons slidably mounted therein, with piston rods 68 connected with the pistons, as is usual in connection with such apparatus. The end of the upper piston rod 68 is connected with the plate 62 at the right in Fig. 6, while the end of the lower piston rod 68 is connected with the plate 62 at the left, such piston rods being adapted accordingly to give said plates 62 the desired movements toward and from each other across the front face of the rotary plate 18.

Improved means is provided for feeding fluid under pressure to the selected end portions of the cylinders 66 and 67. This means comprises a rod 69 having a central bore therethrough as indicated at 69a in Figs. 1 and 4; said rod 69 being positioned in axially disposed openings through the plates 17 and 18 and the pinion 22. At its rear end, the rod 69 is connected with a cross arm portion 70 having ducts extending longitudinally of the arm connected with longitudinally extending openings through the rod, as hereinafter described. Flexible tubes 71 are connected with the ducts in the cross bar portion 70 for feeding fluid under pressure to said ducts from any suitable source; said cross bar portion and the rod 69 being held in stationary position without any rotary movement with respect to the plates 17.

As shown in Fig. 4, a tube 72 is mounted in the bore 69a of the rod 69 in spaced relationship to the wall of the bore so as to permit fluid under pressure to pass through either the tube or through the bore about the tube. On the front end of the rod 69, a head 73 is rotatably mounted, with a row of balls 74 positioned in suitable raceways for permitting free rotation of said head 73 about the rod, such balls 74 serving also as an end-thrust bearing for holding the head removably in position on the end of the rod. As is clearly shown in said Fig. 4, the head 73 is provided with a plate 75 fixedly secured thereto by welding or in any other suitable manner, and connected by machine screws 76 with the plate 18 causing said head 73 to rotate with said plate 18.

As also clearly is shown in Fig. 4, the head 73 is provided with fitting-sockets 77 in its top and bottom faces, which in turn are connected by openings 78, and a circumferential groove 79, with the bore 69a through said rod 69. The end of the tube 72 at the right in Fig. 4 opens directly into the central opening in the head 73, which in turn is connected with fitting-sockets 80 in the side faces of said head 73. At opposite sides of the groove 79, sealing rings 81 are provided about the rod 69, serving to prevent any end-thrust effect by the fluid under pressure delivered through the bore 69a of said rod 69. In the arrangement illustrated, it is the flexible tube 71 at the left in Fig. 2 which communicates with the bore of the rod 69 and through which the fluid under heavy pressure is fed to the cylinders for the movement of the pressure arms 64 toward each other into position for gripping a load, said pressure arms being given their movement away from each other by the effect of the fluid under pressure delivered through the flexible tube 71 at the right in said Fig. 2.

As shown in Fig. 9, the fitting-sockets 77 in the top and bottom faces of the head 73 are connected by flexible tubes 82 and 83 with corresponding ends of the cylinders 66 and 67, and the fitting-sockets 80 in the side faces of the head are connected by flexible tubes 84 and 85 with the opposite ends of said cylinders respectively. The arrangement is such that when fluid under pressure is fed through the flexible tube 71 which is connected through the cross bar portion 70 with the bore 69a of the rod 69, such fluid under pressure is fed through the flexible tube connections 82 and 83 for moving the pressure arms 64 toward each other. When fluid under pressure is fed through the flexible tube 71 which is connected through said cross bar portion 70 with the tube 72, such fluid under pressure is fed through the flexible tube connections 84 and 85 for moving the pressure arms 64 away from each other.

As shown in Figs. 1 and 3, a cover plate 86 is secured in position at the rear face of the revolving apron structure; such cover plate, in the construction illustrated, being mounted on the guide brackets 28.

By the use of my improved construction, I have provided a very compact structure by which my improved apron comprising the rotatable plate 18 is adapted to be rotated through something more than 180° by power applied to my combination cylinder and rack bar members, with the power for moving the cylinder with respect to the piston applied by the use of fluid under pressure fed to the selected end of the cylinder through openings extending through the piston rods longitudinally of said rods. I have provided also a very compact arrangement of the means for feeding fluid under pressure to the load grip mechanism mounted on the front face of the revolving apron comprising the plate 18, so as to permit such load grip means to be operated freely without regard to its angular position with respect to the truck on which it is mounted.

While I have illustrated a preferred embodiment of my invention, many modifications may be made without departing from the spirit of my invention, and I do not wish to be limited to the precise details of construction set forth, but desire to avail myself of all advantages within the scope of the appended claims.

Having thus described my invention, what I claim as new and desire to secure by Letters Patent of the United States is:

1. In combination, a rod having a longitudinal bore extending therein, a tube extending through said bore in spaced relation to the walls of the bore, a housing member surrounding one end of said rod, the tube being adapted to feed fluid under pressure into the end portion of said housing member, an opening in the wall of said hollow rod communicating with said bore for feeding fluid under pressure from said bore into said housing at a point in spaced relationship to the said end portion of said housing member, said housing member being rotatably mounted with respect to the rod, sealing rings carried by said rod at opposite sides of the opening in the wall of the hollow rod in communication with said bore for preventing the application of an end-thrust effect on said rod by the pressure in said bore, and an end-thrust ball bearing holding said housing member from movement longitudinally of said rod in opposition to the end-thrust effect of the pressure in said tube.

2. In combination, a rod having a longitudinally extending bore therein, a tube extending through said bore in spaced relation to the walls of the bore, a revolving head surrounding one end of said rod and having a fitting-socket in its side wall at about the end of the rod in communication with the tube end and a fitting-socket in its side wall in slightly spaced relationship to the end of the rod and in communication with said bore, means for selectively connecting the rod bore or the tube with a source of fluid under pressure for supplying said fluid to one fitting opening or the other, and means for connecting the fitting-sockets with opposite end portions of cylinders having pistons operating therein for moving oppositely positioned gripping arms toward and from each other.

3. A combination as specified in claim 2, in which said pistons and arms are mounted on supporting means revolvable about an axis positioned in centered position between said arms.

4. A combination as specified in claim 3, in which said pistons and arms are mounted on a load grasping assembly which in turn is revolvable with said revolving head about a horizontal axis positioned between said arms.

5. In combination, a first plate, a second plate rotatably connected with said first plate in face to face relationship thereto, means for rotating said second plate with respect to the first plate, a rod positioned in axial openings through said two plates and having longitudinally extending openings through the rod, means connected with one end of said rod for delivering fluid under pressure selectively to said longitudinally extending openings through the rod, a head member rotatably mounted on the other end portion of said rod and provided with fitting-sockets communicating respectively with the longitudinally extending openings through the rod, by way of transversely extending openings in the rod and a groove about the rod connecting with the transversely extending openings, means for connecting said head fixedly with said second plate, a frame mounted on the outer face of said second plate, oppositely positioned arms slidably mounted on said frame, means comprising cylinders and pistons operating in the cylinders on said frame connected with said arms for moving the arms toward and from each other, means for operatively connecting the fitting-sockets of said head with opposite end portions of said cylinders for causing movement of said arms selectively toward and from each other, an end-thrust ball bearing connecting the head and the rod, and sealing rings about the rod at opposite sides of said groove for preventing any substantial end-thrust effect on said rod by the pressure in the longitudinally extending openings.

LESLIE G. EHMANN.

REFERENCES CITED

The following references are of record in the file of this patent:

UNITED STATES PATENTS

| Number | Name | Date |
|---|---|---|
| 1,356,149 | Hubback | Oct. 19, 1920 |
| 1,878,994 | Abbe | Sept. 27, 1932 |
| 1,909,813 | Crosbie | May 16, 1933 |
| 2,075,819 | Manly | April 6, 1937 |
| 2,251,452 | Hirst | Aug. 5, 1941 |
| 2,461,877 | Brereton | Feb. 15, 1949 |
| 2,497,118 | Ferrario et al. | Feb. 14, 1950 |
| 2,522,128 | Lehmann | Sept. 12, 1950 |
| 2,541,268 | Milz | Feb. 13, 1951 |